(12) United States Patent
Treadwell et al.

(10) Patent No.: US 10,984,426 B2
(45) Date of Patent: Apr. 20, 2021

(54) MODELING COMPARABLE PROPERTIES WHERE THE SUBJECT PROPERTY IS A CONDOMINIUM PROPERTY

(75) Inventors: John D. Treadwell, Washington, DC (US); Eric Rosenblatt, Derwood, MD (US); Hamilton Fout, Rockville, MD (US); Alexei M. Kisselev, Burke, VA (US); Robert Mealey, Washington, DC (US)

(73) Assignee: Fannie Mae, Washington, DC (US)

( * ) Notice: Subject to any disclaimer, the term of this patent is extended or adjusted under 35 U.S.C. 154(b) by 473 days.

(21) Appl. No.: 13/164,128

(22) Filed: Jun. 20, 2011

(65) Prior Publication Data

US 2012/0323799 A1 Dec. 20, 2012

(51) Int. Cl.
*G06Q 30/02* (2012.01)
*G06Q 50/16* (2012.01)

(52) U.S. Cl.
CPC ............ *G06Q 30/02* (2013.01); *G06Q 50/16* (2013.01)

(58) Field of Classification Search
CPC ..................... G06Q 30/0278; G06Q 50/16
See application file for complete search history.

(56) References Cited

U.S. PATENT DOCUMENTS

| | | | |
|---|---|---|---|
| 5,361,201 A * | 11/1994 | Jost et al. | 705/35 |
| 5,966,700 A | 10/1999 | Gould et al. | |
| 6,178,406 B1 * | 1/2001 | Cheetham et al. | 705/7.34 |
| 7,099,843 B1 | 8/2006 | Cassidy et al. | |
| 7,289,965 B1 | 10/2007 | Bradley et al. | |
| 7,340,431 B1 | 3/2008 | McManus et al. | |
| 7,451,095 B1 | 11/2008 | Bradley et al. | |
| 7,509,261 B1 | 3/2009 | McManus et al. | |
| 7,593,890 B1 | 9/2009 | Bradley et al. | |
| 7,647,272 B1 | 1/2010 | Muren | |
| 7,693,764 B1 | 4/2010 | Gordon et al. | |
| 7,711,574 B1 | 5/2010 | Bradley et al. | |
| 7,792,742 B1 | 9/2010 | Thomas et al. | |
| 7,797,166 B1 | 9/2010 | Bradley et al. | |
| 7,835,919 B1 | 11/2010 | Bradley et al. | |
| 7,882,025 B1 | 2/2011 | Seal et al. | |
| 7,904,381 B1 | 3/2011 | Tatang et al. | |
| 7,941,365 B1 | 5/2011 | Bradley et al. | |

(Continued)

OTHER PUBLICATIONS

"Do Condo Fees Affect Property Values," Alpine Lakes Realty, http://activerain.com/blogsview/1916330/do-condo-fees-effect-property-values-, Oct. 15, 2010.*

(Continued)

*Primary Examiner* — Aryan E Weisenfeld
(74) *Attorney, Agent, or Firm* — Michael Best and Friedrich LLP

(57) ABSTRACT

Modeling appropriate comparable properties for a condo property includes accessing property data, and identifying candidate condo properties in the accessed property data to produce condo property data. A regression is performed using the property data, with the regression modeling the relationship between price and explanatory variables, and the explanatory variables including at least one variable that is specific to condo property assessment. The regression accommodates a modeling of comparable properties, such that a subject condo property and comparable properties may be identified and displayed.

17 Claims, 8 Drawing Sheets

(56) References Cited

U.S. PATENT DOCUMENTS

| | | | |
|---|---|---|---|
| 7,941,366 B1 | 5/2011 | Bradley et al. | |
| 7,945,510 B1 | 5/2011 | Bradley et al. | |
| 7,974,854 B1 | 7/2011 | Bradley et al. | |
| 7,987,137 B1 | 7/2011 | Thomas et al. | |
| 7,996,304 B1 | 8/2011 | Thomas et al. | |
| 7,996,313 B1 | 8/2011 | McMurray et al. | |
| 8,010,377 B1 | 8/2011 | Bradley et al. | |
| 8,046,306 B2 * | 10/2011 | Stinson | 705/313 |
| 8,064,703 B2 * | 11/2011 | Newcomer et al. | 382/190 |
| 8,108,302 B1 | 1/2012 | Bradley et al. | |
| 8,140,421 B1 | 3/2012 | Humphries et al. | |
| 8,209,258 B1 | 6/2012 | Seal et al. | |
| 8,239,318 B1 | 8/2012 | Bradley et al. | |
| 8,244,563 B2 | 8/2012 | Coon et al. | |
| 8,255,320 B1 | 8/2012 | Seal et al. | |
| 8,280,806 B1 | 10/2012 | Bradley et al. | |
| 8,326,749 B1 | 12/2012 | Seal et al. | |
| 8,386,395 B1 | 2/2013 | Gordon et al. | |
| 8,401,868 B1 | 3/2013 | Bradley et al. | |
| 8,401,961 B1 | 3/2013 | McMurray et al. | |
| 8,447,688 B1 | 5/2013 | Thomas et al. | |
| 8,521,644 B1 | 8/2013 | Hanson et al. | |
| 2005/0086283 A1 * | 4/2005 | Marshall | 709/200 |
| 2005/0154656 A1 | 7/2005 | Kim et al. | |
| 2005/0154657 A1 | 7/2005 | Kim et al. | |
| 2008/0004893 A1 | 1/2008 | Graboske | |
| 2008/0301064 A1 * | 12/2008 | Burns | 705/400 |
| 2011/0055091 A1 * | 3/2011 | Budlong | 705/313 |

OTHER PUBLICATIONS

Richard Cebula, "The Hedonic Pricing Model Applied to the Housing Market," Published 2009.*

Kerry D. Vandell, "*Optimal Comparable Selection and Weighting in Real Property Valuation*", AREUEA Journal, vol. 19, No. 2, 1991, pp. 213-239.

George W. Gau et al., "*Optimal Comparable Selection and Weighting in Real Property Valuation: An Extension*", Journal of the American Real Estate and Urban Economics Association, vol. 20, No. 1, 1992, pp. 107-123.

* cited by examiner

FIG. 6A

CRAM - Alpha (Condo Appraisal ID# 1574426) - Windows Internet Explorer

URL | Appr 1574426 · Doc 1000000011 · Prop 101554925 · Loan - Veros - 469 SMITH RD APT 2405, HONOLULU, HI 96815 · Appraised $486,000.00 on 2010-05-04 · Purpose: [Refi]

| Mapped Comps | Comp Analysis | Adjustment Analysis | Form 1004 | NUC Docs | UCDP Messages | Summary | Value History | Structure characteristics | Sales History | Build Fax | Appraisals | Loan Info | Notes |

Appraiser Comps

| | Address | Age | Sq ft | Bed | Bath | Road | Ocean | GD | Fcl | Date | Amount | Appr $ |
|---|---|---|---|---|---|---|---|---|---|---|---|---|
| S | 469 SMITH RD APT 2405, HONOLULU, HI 96815 | 39 | 948 | 2 | 2 | | | | | | | $486,000 |
| AS | 469 SMITH RD APT 2405, HONOLULU, HI 96815 | 39 | 948 | 2 | 2 | | | 0 | 0 | 2010-04-30 | $470,000 | $477,500 |
| AS | 469 SMITH RD APT 2405, HONOLULU, HI 96815 | 39 | 948 | 2 | 2 | | | 0 | 0 | 2009-12-23 | $500,000 | $477,500 |
| AS | 343 JONES LN APT 2203, HONOLULU, HI 96... | 26 | 945 | 2 | 2 | | | 0.16 | 0 | 2009-12-11 | $550,000 | $506,800 |
| AS | 469 SMITH RD APT 2405, HONOLULU, HI 96815 | 39 | 948 | 2 | 2 | | | 0 | 0 | 2009-10-22 | $549,000 | $484,914 |

Address or location... | Apprs | Props | Activity 610, 614
614
620a
610a
600a

BG Metrics ▼ Toggle StreetView availability | Map in LaMnDA | Dataappraise | Detailed results | StreetView | SkyView | (null sales in past yr)

FIG. 6B

MODELING COMPARABLE PROPERTIES WHERE THE SUBJECT PROPERTY IS A CONDOMINIUM PROPERTY

BACKGROUND OF THE INVENTION

1. Field of the Invention

This application relates to assessment of comparable properties and more particularly to modeling appropriate comparables where the subject property is a condominium property.

2. Description of the Related Art

Appraisals are traditionally performed by human appraisers who assess a subject property and apply various factors to identify a set of comparable properties against which the value of the subject property may be compared. The results may be described in an appraisal report listing the comparable properties.

Appraisals may be variously used in connection with transactions including loan approval as well as downstream transactions. Appraisal reports may be reviewed in connection with the approval of transactions. They may also be reviewed at other times, such as to assess the appraisal, to identify the possibility of a fraudulent transaction, or to assess the work of an appraiser. Traditionally, this might be performed by an assessor who reviews the report, perhaps does some investigation, and then assesses the results.

The traditional techniques for reviewing and assessing appraisals are inconsistent and do not lend themselves to large scale review. Additionally, it is particularly difficult to model appropriate comparables where the subject property is a condominium property.

What is needed are improved techniques for modeling appropriate comparable properties.

SUMMARY OF THE INVENTION

Modeling appropriate comparable properties for a condo property includes accessing property data, and identifying candidate condo properties in the accessed property data to produce condo property data. A regression is performed using the property data, with the regression modeling the relationship between price and explanatory variables, and the explanatory variables including at least one variable that is specific to condo property assessment. The regression accommodates a modeling of comparable properties, such that a subject condo property and comparable properties may be identified and displayed.

Refinements to the modeling may include determining a set of value adjustments for comparable properties based upon differences in the explanatory variables between the subject condo property and comparable properties, as well as determining an economic distance between the subject condo property and comparable properties, where the economic distance is constituted as a quantified value determined from the value adjustments.

Weighting, ranking and displaying of the comparable properties on a map image may also be performed based upon their appropriateness as comparables for the subject condo property. The weighting and ranking may be based upon the economic distance from the subject condo property and other factors (e.g., geographical distance and temporal distance).

Various techniques are disclosed for identifying candidate condo properties. Determination factors include trusted source of information, duration and consistency of identification as condo, identification of project/subdivision identifiers deemed to correspond to condo projects, and frequency of condo properties in unit geographical areas.

The present invention can be embodied in various forms, including business processes, computer implemented methods, computer program products, computer systems and networks, user interfaces, application programming interfaces, and the like.

BRIEF DESCRIPTION OF THE DRAWINGS

These and other more detailed and specific features of the present invention are more fully disclosed in the following specification, reference being had to the accompanying drawings, in which:

FIG. 6A is a display diagram illustrating an example of a map image and corresponding property grid data for a list of appraiser-chosen comparable properties, where the underlying properties are determined to be condo properties.

FIG. 6B is a display diagram illustrating an example of a map image and property grid data updated to indicate appraiser-chosen comparable properties among a ranked listing of model-chosen comparable properties, where the underlying properties are determined to be condo properties.

DETAILED DESCRIPTION OF THE INVENTION

Figure 1A:
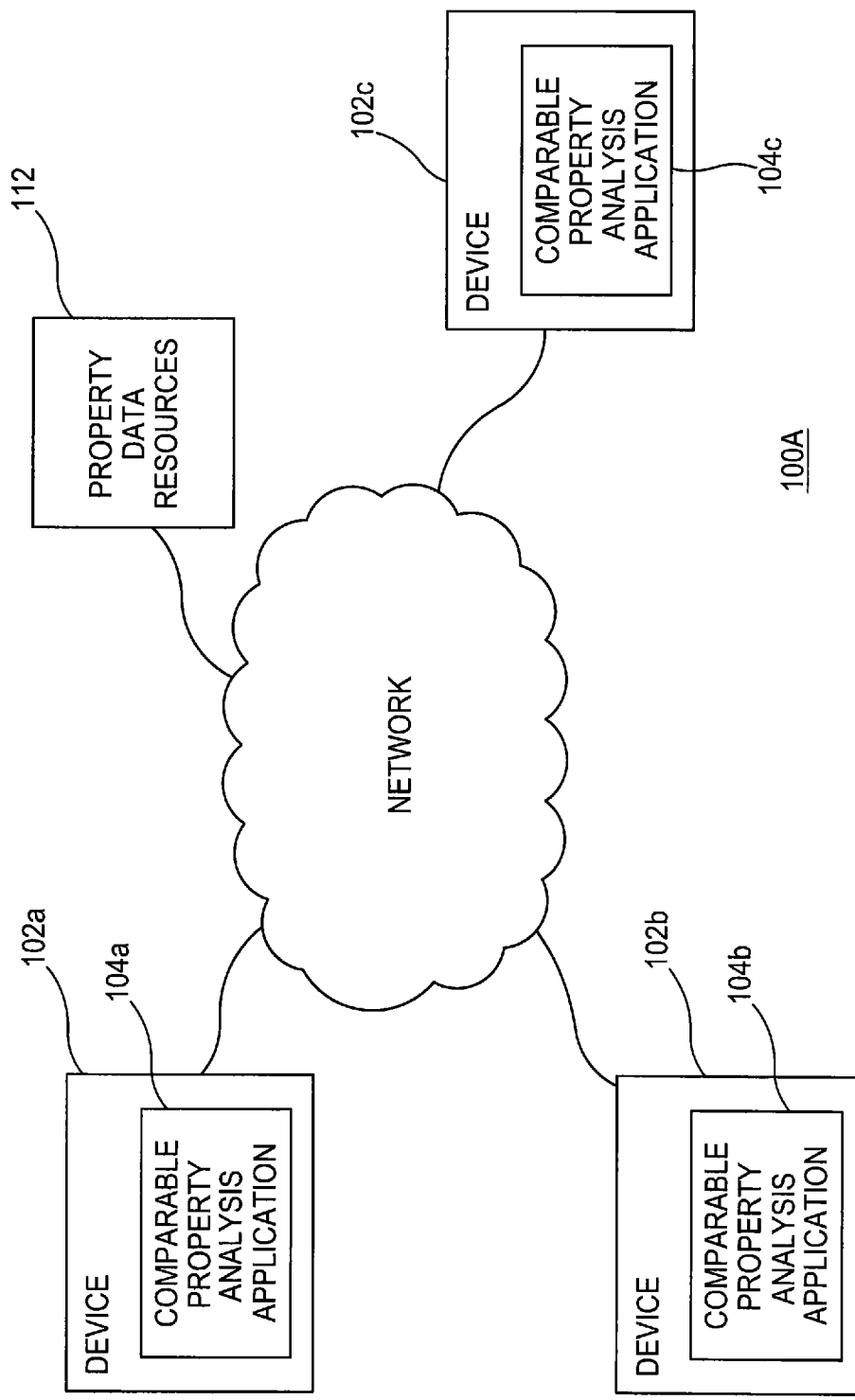
FIGS. 1A-B are block diagrams illustrating examples of systems in which a comparable property analysis application operates.

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

Although condo and single family properties are fundamentally similar in that they are both dwelling spaces, it would not be accurate to think of a condo as equivalent to a single family residence without a lot. From an automated valuation perspective, there are a number of differences beyond the absence of a lot size that justify the creation of a separate model for condo properties.

For one, as condo projects inherently contain multiple units, there is a built-in comparable sales pool for a condo subject that does not necessarily exist for single family residences. Within the condo project, a number of the unobserved characteristics should be roughly homogenous throughout, so the value obtained through adjusting these comp properties toward the subject should be more reflective of reality than when properties that are dissimilar in terms of the unobserved characteristics are adjusted towards the subject.

Additionally, condo properties tend to be concentrated in particular parts of a broad housing market (e.g., U.S. housing market), particularly in densely populated urban areas. In these areas there is a tendency to have more accurate data as more populous counties have strong incentives to keep all of their records digitally, which typically translates into higher quality data being passed along to the data aggregation companies. In addition, in certain urban environments there is richer data on things such as dining and entertainment points of interest, public transportation, and the distance to the central business district or commuter hub. According to one aspect, embodiments of the condo model described herein exploit this richer data through GIS analysis and other methods in order to enhance the accuracy of the condo model along dimensions that are not relevant to the single family model at large.

Still further, condo and single family properties are typically viewed as imperfect substitutes. That is, a given individual may not be indifferent to a 2 bedroom condo in lieu of a 2 bedroom detached home, all else being equal. Consequently, if the agents in the condo market are significantly different from the agents in the single family market then it is useful for model coefficients to be estimated separately for these two groups as the various factors that are being modeled into the estimated price might have a very different value to the two groups.

History also suggests that condo prices are much more volatile than single family detached home prices. Since a model contains a number of location and time controls, it follows that these controls should be estimated separately for condo and single family detached properties.

Accordingly, consistent with an embodiment of the present invention, modeling appropriate comparable properties for a condo property includes accessing property data, and identifying candidate condo properties in the accessed property data to produce condo property data. A regression is performed using the condo property data, with the regression modeling the relationship between price and explanatory variables, and the explanatory variables including at least one variable that is specific to condo property assessment. The regression accommodates a modeling of comparable properties, such that a subject condo property and comparable properties may be identified and displayed.

Refinements to the modeling may include determining a set of value adjustments for comparable properties based upon differences in the explanatory variables between the subject condo property and comparable properties, as well as determining an economic distance between the subject condo property and comparable properties, where the economic distance is constituted as a quantified value determined from the value adjustments.

Weighting, ranking and displaying of the comparable properties on a map image may also be performed based upon their appropriateness as comparables for the subject condo property. The weighting and corresponding ranking may be based upon the economic distance from the subject condo property and other factors (e.g., geographic and temporal distance).

Various techniques are disclosed for identifying candidate condo properties. Determination factors include source of information, duration and consistency of identification as condo, and identification of root identifiers deemed to correspond to condo projects.

Various models may be implemented to generate the ranked listing of comparable properties. In one example, the property data is accessed and a regression models the relationship between price and explanatory variables. For example, a hedonic regression is performed at a geographic level (e.g., county) sufficient to produce reliable results. A pool of comparables is identified, such as by initial exclusion rules based upon distance from and other factors in relation to a subject property. A set of adjustments for each comparable is determined using adjustment factors drawn from the regression analysis. These adjustments are then used to derive an economic distance between each comparable and the subject property. For example, the economic distance may be a value indicative of the estimated price difference between a comp and the subject that is determined from the set of adjustments for that comp. The comparables are weighted according to the economic distance, physical distance and time (of sale) between the comparable and the subject property. This weighting determines the ranked listing.

In connection with the display of the ranked listing, a map image is displayed to illustrate the geographic distribution of the subject property and the comparable properties. Thus, in addition to offering the ranked listing that indicates where among the ranking the appraiser-chosen comparables are listed, there is a concurrent display on the map image that gives an immediate indication of the location of the comparable properties (both model-chosen and appraiser-chosen). This allows further assessment as to general proximity between the comparables and the subject property, whether the comparables are in the same or a different neighborhood, where the comparables are located with respect to significant features (highways, schools, bodies of water, etc.), etc.

An associated property data grid further details information about the subject and comparable properties. The grid can be sorted according to a variety of property and other characteristics, and operates in conjunction with the map image to ease review of the comparables and corresponding criteria. The map image may be variously scaled and updates to show the subject property and corresponding comparables in the viewed range, and interacts with the grid (e.g., cursor overlay on comparable property in the map image allows highlighting of additional data in the grid).

(i) Hedonic Equation

Various models may be used to generate the model-chosen comparable properties, including but not limited to one using a hedonic regression technique.

One example of a hedonic equation is described below. In the hedonic equation, the dependent variable is sale price and the explanatory variables can include the physical characteristics, such as gross living area, age, number of bedrooms, number of bathrooms, and condo fees, as well as location specific effects, time of sale specific effects, property condition effect (or a proxy thereof). This is merely an example of one possible hedonic model. The ordinarily skilled artisan will readily recognize that various different variables may be used in conjunction with the present invention.

In this example, the dependent variable is the logged sale price. The explanatory variables are:

(1) Four continuous property characteristics:
 (a) log of gross living area (GLA),
 (b) log of Age,
 (c) Number of Bathrooms;
 (d) HOA/Condo Fees, and
(2) Five fixed effect variables:
 (a) Number of Bedrooms
 (b) location fixed effect (e.g., by Census Block Group (CBG));
 (c) Time fixed effect (e.g., measured by 3-month periods (quarters) counting back from the estimation date);
 (d) Foreclosure status fixed effect, which captures the maintenance condition and possible REO discount; and (e) a "GIS" or Graphical Information Systems variable pertinent to proximity (e.g., bordering) a particular geographical feature of interest.

In one example, the GIS feature may be a body of water, such the ocean, with ocean front condos enjoying enhanced valuation. However, as noted above, condo properties tend to be concentrated in particular parts of a broad housing market (e.g., U.S. housing market), particularly in densely populated urban areas. In these areas there is a tendency to have more accurate data as more populous counties have strong incentives to keep all of their records digitally, which typically translates into higher quality data being passed along to the data aggregation companies. In addition, in certain urban environments there is richer data on things such as dining and entertainment points of interest, public transportation, and the distance to the central business district or commuter hub. Any number "N" of such different features are determined and accommodated by the condo comp model. Thus, these additional GIS features of interest are also among those implemented by the model.

With the above variables, an example equation (Eq. 1) is as follows:

$$\ln(p) = \beta_{gla} \cdot \ln(GLA) + \beta_{age} \cdot \ln(AGE) + \\ \beta_{bath} \cdot BATH + \sum_{h=\{0,1,2,3+\}} BED_h + \beta_{fees} \cdot FEES + \\ \sum_{i=1}^{N_{CBG}} LOC_i^{CBG} + \sum_{j=1}^{N_{QTR}} TIME_j + \sum_{k=\{0,1\}} FCL_k + \sum_{l=1}^{N_{GIS}} GIS_l + \varepsilon \quad \text{(Eq. 1)}$$

The above equation is offered as an example, and as noted, there may be departures. For example, although CBG is used as the location fixed effect, other examples may include Census Tract or other units of geographical area. Additionally, months may be used in lieu of quarters, or other periods may be used regarding the time fixed effect. These and other variations may be used for the explanatory variables.

Additionally, although the county may be used for the relatively large geographic area for which the regression analysis is performed, other areas such as a multi-county area, state, metropolitan statistical area, or others may be used. Still further, some hedonic models may omit or add different explanatory variables.

(ii) Exclusion Rules

Comparable selection rules are then used to narrow the pool of comps to exclude the properties which are determined to be insufficiently similar to the subject.

A comparable property should be located in a relative vicinity of the subject and should be sold relatively recently; it should also be of similar size and age. The "N" comparables that pass through the exclusion rules are used for further analysis and value prediction.

For example, the following rules may be used to exclude comparables pursuant to narrowing the pool:

(1) Neighborhood: comps must be located in the Census Tract of the subject or its immediate neighboring tracts;

(2) Time: comps must be sales within twelve months of the effective date of appraisal or sale;

(3) GLA must be within a defined range, for example:

$$\frac{2}{3} \le \frac{GLA_S}{GLC_C} \le \frac{3}{2}$$

(4) Age similarity may be determined according to the following Table 1:

TABLE 1

| Subject Age | 0-2 | 3-5 | 6-10 | 11-20 | 21-40 | 41-65 | 65+ |
|---|---|---|---|---|---|---|---|
| Acceptable Comp Age | 0-5 | 0-10 | 2-20 | 5-40 | 11-65 | 15-80 | 45+ |

(5) HOA/Condo similarity is market specific, as the maintenance obligations of condo associations may vary greatly from area to area. In one example, the exclusion rule is based on the HOA/Condo fee per square foot, and a given property is excluded if the comps HOA/foot is less than half of the subject's or more than double. Alternatively, the following exclusion rule may be applied:

0.5<=(Subject HOA per SQfoot/Comp HOA per SQfoot)<=2.0

It should be understood that certain markets have very low HOA fees and in these situations the example provided above filters too often. In some embodiments it may be preferable to omit the exclusion rule related to condo fees where the geographical area (e.g., county) has an average less than a threshold amount (e.g., $100, or alternatives depending upon the market).

These exclusion rules are provided by way of example. There may be a set of exclusion rules that add variables, that omit one or more the described variables, or that use different thresholds or ranges.

(iii) Adjustment of Comps

Given the pool of comps selected by the model, the sale price of each comp may then be adjusted to reflect the difference between a given comp and the subject in each of the characteristics used in the hedonic price equation.

For example, individual adjustments are given by the following set of equations (2), where CV is a generalized representation of the continuous variables and FE is a generalized representation of the fixed effect variables, the S subscript represents the subject and the C subscript represents the comprable:

$$A_{CVi} = \exp[(\ln(CV_{iS}) - \ln(CV_{iC})) \cdot \beta_{CVi}];$$

$$A_{FEj} = \exp[(FE_{jS} - FE_{jC})]; \quad \text{(Eq. 2)}$$

The specific coefficients βgla, βage, βbath, βfees, BED, GIS, LOC, TIME, FCL are obtained from the hedonic price equation described above. Hence, the adjusted price of the comparable sales is summarized as:

$$p_C^{adj} = p_C \cdot \prod_{i \in \{gla,age,bath,fees\}} CV_i \cdot \prod_{i \in \{bed,GIS,loc,time,fcl\}} FE_j = \quad \text{(Eq. 3)}$$

$$p_C \cdot ADJ_{TOTAL}$$

(iv) Weighting of Comps and Value Prediction

Because of unknown neighborhood boundaries and potentially missing data, the pool of comparables will likely include more than are necessary for the best value prediction in most markets. The adjustments described above can be quite large given the differences between the subject property and comparable properties. Accordingly, rank ordering and weighting are also useful for the purpose of value prediction.

The economic distance $D_{eco}$ between the subject property and a given comp may be described as a function of the differences between them as measured in dollar value for a variety of characteristics, according to the adjustment factors described above.

Specifically, the economic distance may be defined as a Euclidean norm of individual percent adjustments for all characteristics used in the hedonic equation:

$$D_{SC}^{eco} = \sqrt{\sum_{i \in \{gla, age, bath, bed, fees, loc, time, fcl, gis\}} (A_i - 1)^2} \quad \text{(Eq. 4)}$$

The comps are then weighted. Properties more similar to the subject in terms of physical characteristics, location, and time of sale are presumed better comparables and thus are preferably accorded more weight in the prediction of the subject property value. Accordingly, the weight of a comp may be defined as a function inversely proportional to the economic distance, geographic distance and the age of sale.

Properties more similar to the subject in term of observed characteristics, location, and time of sale are considered better comparable sales (e.g., since fewer adjustments to the observed comp transaction price are required), and hence are given more weight in the prediction of the subject property value. Additionally, as a condo property is by definition a single unit within a larger structure, the other properties within the structure or condo project are going to share a number of unobserved characteristics with the subject property that outside comps may not have in common. Accordingly, the modeling preferably includes a comp weight that is inversely proportional to the economic distance, geographic distance and the age of sale, along with a special adjustment "PROJ" (where PROJ>1) to comparable sales that are determined to be from the same building or project as the subject in order to increase the weight of such comps with respect to the subject property. For example, comp weight may be defined as:

$$w_C = \frac{1 \cdot PROJ}{D_{SC}^{eco} \cdot D_{SC}^{geo} \cdot dT_{SC}} \quad \text{(Eq. 5)}$$

where $D_{geo}$ is a measure of a geographic distance between the comp and the subject, defined as a piece-wise function:

$$D_{SC}^{geo} = \begin{cases} 0.1 & \text{if} \quad d_{SC} < 0.1 \text{ mi} \\ d_{SC} & \text{if} \quad 0.1 \text{ mi} \leq d_{SC} \leq 1.0 \text{ mi} \\ 1.0 + \sqrt{d_{SC} - 1.0} & \text{if} \quad d_{SC} > 1.0 \text{ mi} \end{cases} \quad \text{(Eq. 6)}$$

dT is a down-weighting age of comp sale factor $$dT_{SC} = \begin{cases} 1.00 & \text{if} \quad (0,90] \text{ days} \\ 1.25 & \text{if} \quad (90,180] \text{ days} \\ 2.00 & \text{if} \quad (180,270] \text{ days} \\ 2.50 & \text{if} \quad (270,365] \text{ days} \end{cases} \quad \text{(Eq. 7)}$$

and PROJ is the special adjustment to comparable sales determined to be from the same building or project as the subject property, in order to increase the weight of those comparables as comparables to the subject property. This value will depend upon the specific market as well as degree to which the controls in the model (which may progress to include additional variables) accurately reflect the differences between the subject and the comparable properties. In one example, estimating an in-building weight for the Miami market, a value of PROJ=1.3 (up weighting properties from the same building/project by 30%) was determined to provide the best fit. It should be noted that the ideal PROJ weight is not independent of the other controls in the model, and as additional meaningful controls are added one should expect the optimal value of PROJ to decline. Theoretically, if a model were to fully control for all differences between the subject and comparable properties, then by the properties of OLS regression, the optimal PROJ value would be 1.

Comps with higher weight receive higher rank and consequently contribute more value to the final prediction, since the predicted value of the subject property based on comparable sales model is given by the weighted average of the adjusted price of all comps:

$$\hat{p}_S = \frac{\sum_{C=1}^{N_{COMPS}} w_C \cdot p_C^{adj}}{\sum_{C=1}^{N_{COMPS}} w_C} \quad \text{(Eq. 8)}$$

As can be seen from the above, the separate weighting following the determination of the adjustment factors allows added flexibility in prescribing what constitutes a good comparable property. Thus, for example, policy factors such as those for age of sale data or location may be separately instituted in the weighting process. Although one example is illustrated it should be understood that the artisan will be free to design the weighting and other factors as necessary.

(v) Listing and Mapping of Comparable Properties

The comparable properties may then be listed according to the weighting, or a ranking from the highest weighted comparable property to the lowest. This listing may be variously limited to accommodate listing them within a display area. For example, a default setting might be 20 comparable properties. The overall list of comparable properties includes, of course, the model-chosen comparable properties. The overall list may also include all of the appraiser-chosen comparables if they are to be reviewed.

According to another aspect, mapping and analytical tools that implement the comparable model are provided. Mapping features allow the subject property and comparable properties to be concurrently displayed. Additionally, a table or grid of data for the subject properties is concurrently displayable so that the list of comparables can be manipulated, with the indicators on the map image updating accordingly.

For example, mapping features include the capability to display the boundaries of census units, school attendance zones, neighborhoods, as well as statistical information such as median home values, average home age, etc.

The grid/table view allows the user to sort the list of comparables on rank, value, size, age, or any other dimension. Additionally, the rows in the table are connected to the full database entry as well as sale history for the respective property. Combined with the map view and the neighborhood statistics, this allows for a convenient yet comprehensive interactive analysis of comparable sales.

With further reference to the figures, examples of environments and particular embodiments implementing the ranking and displaying of comparable properties are now further described.

Figure 1B:
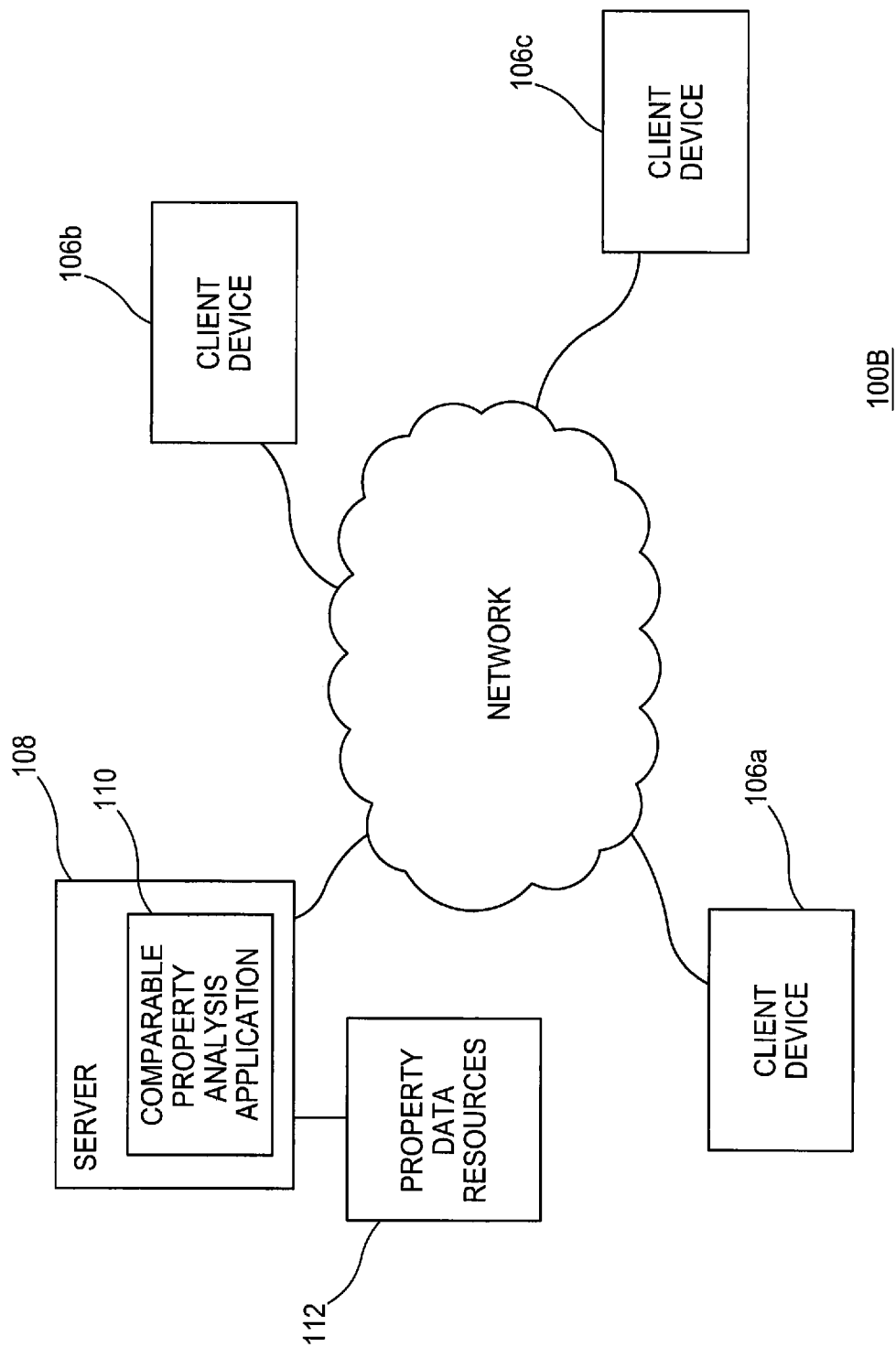

FIGS. 1A-B are block diagrams illustrating examples of systems 100A-B in which a comparable property analysis application operates.

FIG. 1A illustrates several user devices 102a-c each having a comparable property analysis application 104a-c.

The user devices 102a-d are preferably computer devices, which may be referred to as workstations, although they may be any conventional computing device. The network over which the devices 102a-d may communicate may also implement any conventional technology, including but not limited to cellular, WiFi, WLAN, LAN, or combinations thereof.

In one embodiment, the comparable property analysis application 104a-c is an application that is installed on the user device 102a-c. For example, the user device 102a-c may be configured with a web browser application, with the application configured to run in the context of the functionality of the browser application. This configuration may also implement a network architecture wherein the comparable property analysis applications 104a-c provide, share and rely upon the comparable property analysis application 104a-c functionality.

As an alternative, as illustrated in FIG. 1B, the computing devices 106a-c may respectively access a server 108, such as through conventional web browsing, with the server 108 providing the comparable property analysis application 110 for access by the client computing devices 106a-c. As another alternative, the functionality may be divided between the computing devices and server. Finally, of course, a single computing device may be independent configured to include the comparable property analysis application.

As illustrated in FIGS. 1A-B, property data resources 110 are typically accessed externally for use by the comparable property analysis application, since the amount of property data is rather voluminous, and since the application is configured to allow access to any county or local area in a very large geographical area (e.g., for an entire country such as the United States). Additionally, the property data resources 110 are shown as a singular block in the figure, but it should be'understood that a variety of resources, including company-internal collected information (e.g., as collected by Fannie Mae), as well as external resources, whether resources where property data is typically found (e.g., MLS, tax, etc.), or resources compiled by an information services provider (e.g., Lexis).

The comparable property analysis application accesses and retrieves the property data from these resources in support of the modeling of comparable properties as well as the rendering of map images of subject properties and corresponding comparable properties, and the display of supportive data (e.g., in grid form) in association with the map images.

Figure 2:
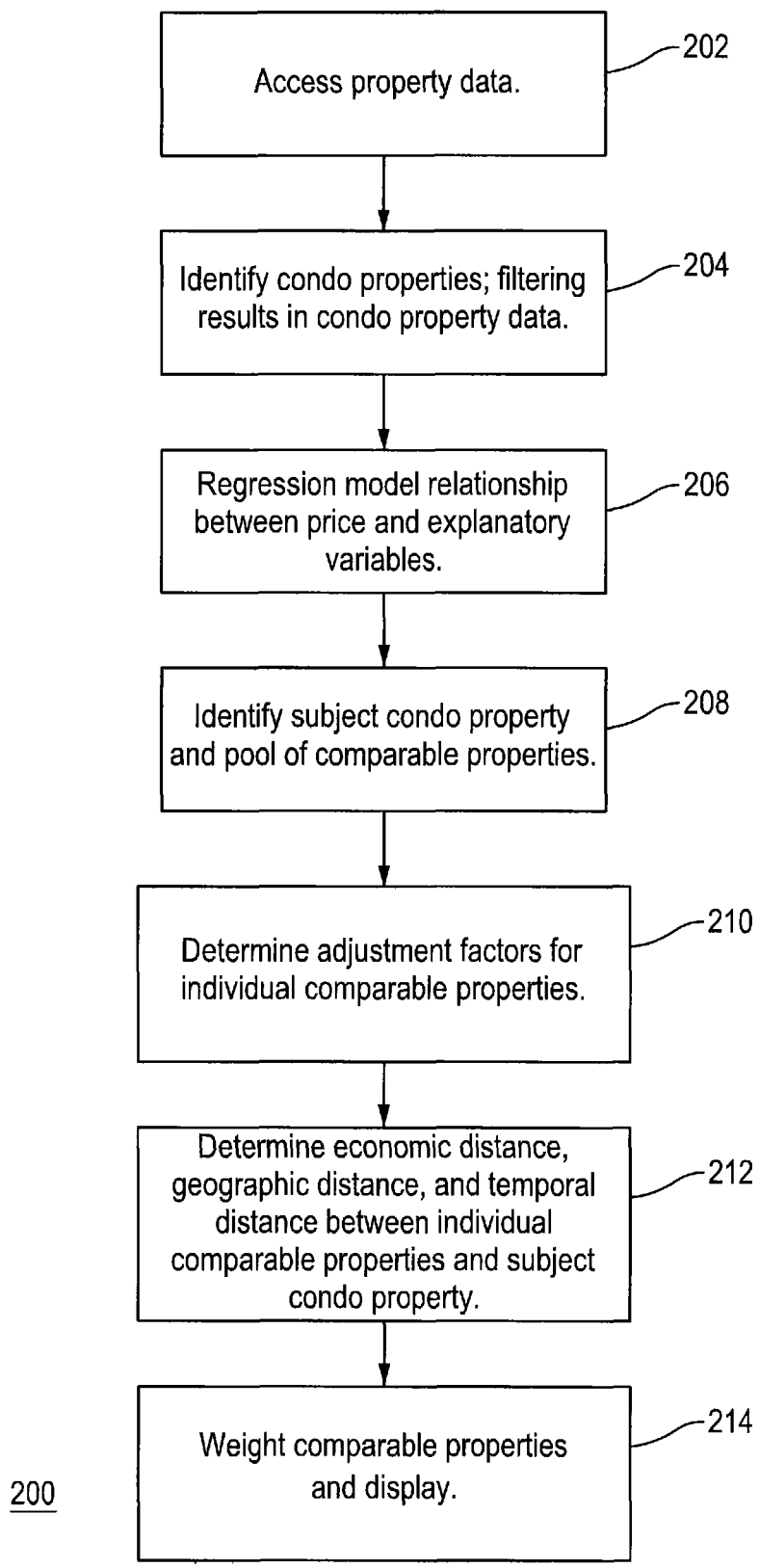
FIG. 2 is a flow diagram illustrating an example of a process for modeling comparable properties.

FIG. 2 is a flow diagram illustrating an example of a process 200 for modeling comparable properties, which may be performed by the comparable property analysis application.

As has been described, the application accesses 202 property data. This may be tailored to a geographical area of interest in which a subject property is located (e.g., county). Additionally, from the property data, an initial filtering to identify 204 condo property data may be applied. The identification of condo properties is described further below, such as with reference to FIG. 5.

Still referring to FIG. 2, a regression 206 modeling the relationship between price and explanatory variables is then performed on the accessed data. Although various alternatives may be applied, a preferred regression is that described above, wherein the explanatory variables are the four property characteristics (GLA, lot size, age, number of bathrooms) as well as the categorical fixed effects (location, time, foreclosure status).

A subject property within the county is identified 208 as is a pool of comparable properties. As described, the subject property may be initially identified, which dictates the selection and access to the appropriate county level data. Alternatively, a user may be reviewing several subject properties within a county, in which case the county data will have been accessed, and new selections of subject properties prompt new determinations of the pool of comparable properties for each particular subject property.

The pool of comparable properties may be initially defined using exclusion rules. This limits the unwieldy number of comparables that would likely be present if the entire county level data were included in the modeling of the comparables.

Although a variety of exclusion rules can be used, in one example they may include one or more of the following: (1) limiting the comparable properties to those within the same census tract as the subject property (or, the same census tract and any adjacent tracts); (2) including only comparable properties where the transaction (e.g., sale) is within 12 months of the effective date of the appraisal or transaction (sale); (3) requiring GLA to be within a range including that of the subject property (e.g., +/−50% of the GLA of the subject property); (4) requiring the age of the comparable properties to be within an assigned range as determined by the age of the subject property (e.g., as described previously); and/or (5) Condo/HOA exclusion rules.

Once the pool is so-limited, a set of adjustment factors is determined 210 for each remaining comparable property. The adjustment factors may be a numerical representation of the price contribution of each of the explanatory variables, as determined from the difference between the subject property and the comparable property for a given explanatory variable. An example of the equations for determining these individual adjustments has been provided above.

Once these adjustment factors have been determined 210, the economic distance, geographic distance and temporal distance between the subject property and respective individual comparable properties is determined 212. The economic distance is preferably constituted as a quantified value representative of the estimated price difference between the two properties as determined from the set of adjustment factors for each of the explanatory variables.

Following determining of the economic distance, the comparable properties are weighted 214 in support of generating a ranking of the comparable properties according to the model. A preferred weighting, described previously, entails a function inversely proportional to the economic distance, geographic distance and age of transaction (typically sale) of the comparable property from the subject property.

The weights may further be used to calculate an estimated price of the subject property comprising a weighted average of the adjusted price of all of the comparable properties.

Once the model has performed the regression, adjustments and weighting of comparables, the information is displayed for the user in the form of grid and map image displays to allow convenient and comprehensive review and analysis of the set of comparables.

Figure 3:
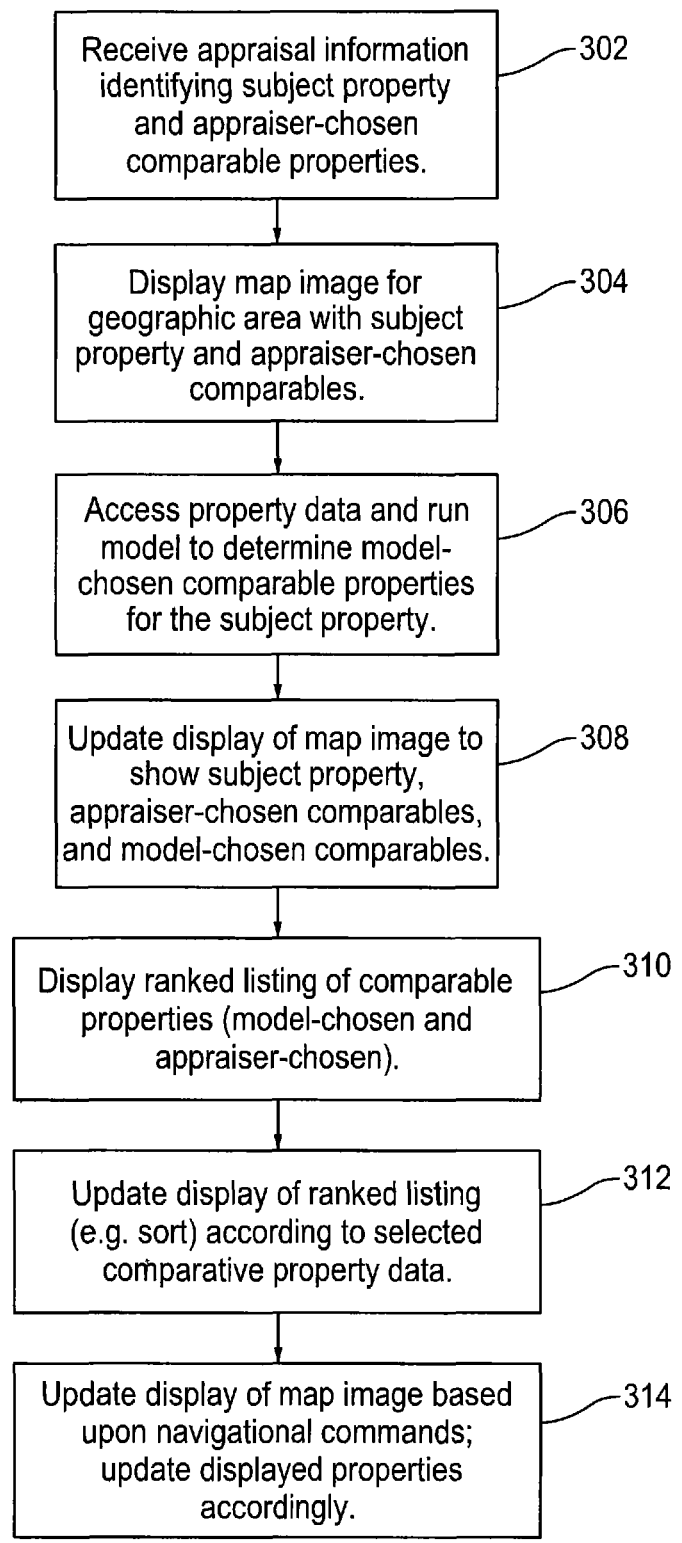
FIG. 3 is a flow diagram illustrating an example of a method for ranking and displaying appraiser-chosen comparable properties.

FIG. 3 is a flow diagram illustrating an example of a method 300 for ranking and displaying appraiser-chosen comparable properties.

The method 300 may initiate with receiving 302 appraisal information identifying a subject property and corresponding appraiser-chosen comparable properties. This appraisal information will often be accessible through a variety of data resources for appraisal reports, which list a relatively short list of comparable properties deemed appropriate for a subject property by an appraiser. Although typically human appraisal reports will be accessed and assessed, any type of appraisal information resource may be accessed and assessed. The appraisal information may be organized in a database, with access to external databases, with a search and retrieval functionality that may be based upon source, date, identification number or other criteria.

Once a set of appraisal information is chosen, the subject property and corresponding appraiser-chosen comparables may be displayed 304 on a map image with indicators showing the subject property and the locations of the comparables. This map image may be acquired from conventional mapping resources, including but not limited to Google maps and the like. Additionally, conventional techniques may be used to depict subject and comparable properties on the map image, such as through determination of the coordinates from address information.

The map imagery may be updated to provide user-desired views, including zooming in and out to provide more narrow or broad perspectives of the depictions of the comparable and subject properties. In addition to the map image, a corresponding grid of comparative property data concerning the listed properties may be concurrently displayed.

The property data includes information as to the location of the properties, and either this native data may be used, or it may be supplemented, to acquire the exact location of the subject property and potential comparable properties on the map image. This allows the map image to be populated with indicators that display the location of the subject property and the comparable properties in visually distinguishable fashion on the map image. The number of comparable properties that are shown can be predetermined or may be configurable based upon user preferences. The number of comparable properties that are shown may also update depending upon the level of granularity of the mage image. That is, when the user updates the map image such as by zooming out to encompass a wider geographical area, when the map image updates additional comparable properties may be rendered in addition to those rendered at a more local range.

The user may also prompt a particular comparable property to be highlighted, such as by cursor rollover or selection of an entry for the comparable property in a listing. When the application receives an indication that a property has been selected, it is highlighted in the map. Conversely, the user may also select the indicator for a property on the map image, which causes display of the details corresponding to the selected property.

At this stage, the appraiser-chosen comparable properties may be thoroughly assessed based upon review of the map image and the corresponding comparative property data for the appraiser-chosen comparables. However, a model-chosen listing of comparable properties is also preferably generated and depicted for further comparison to and assessment of the appraiser-chosen comparable properties.

Initially, this entails accessing property data and running a model (306) to determine model-chosen comparable properties for the subject property. In one example, the model may be the described hedonic regression performed at a geographic level (e.g., county) sufficient to produce reliable results. As set forth in further detail above, the described model identifies a pool of comparables, determines adjustments for each comparable using adjustment factors drawn from the regression analysis, derives an economic distance between each comparable and the subject property, and weights the comparables according to the economic distance between the comparable and the subject property. This weighting can be used to determine a ranked listing, with the highest weighting being the closest-ranked comparable, and so on. Although the particulars of one model are described herein, it should be understood that alternative particulars may be implemented according to the present invention.

The model produces a set of model-chosen comparable properties. The map image display is preferably updated 308 to indicate not only the subject property and the appraiser-chosen comparables, but also the additional model-chosen comparables. Preferably, the subject property, appraiser-chosen comparables and model-chosen comparables are depicted using different indicators, so that the user can identify the different properties and their locations on the map image. If necessary, the map image may automatically adjust for this update, such as in situations where a wider area is needed to concurrently depict the subject, appraiser and model-chosen comparables properties.

The listing of comparative property data is also updated 310 to display the ranked listing of the model-chosen comparable properties. This ranked listing will include both appraiser-chosen comparable properties, depending upon where they fall in the ranking, as well as model-chosen comparable properties that were not selected by the appraiser. The ranked listing provides an immediate indication as to how appropriate the model indicates the appraiser-chosen comparable properties to be as comparable for the subject property.

As with the listing before the update, the list may be variously updated 312 to sort and review the comparative data for the listed properties, for "drill down" assessment of the appropriateness of the appraiser-chosen comparable properties. Preferably, the listing is concurrently displayed with the map image to highlight location of selected properties while they are being reviewed.

Additionally, the map image may be further updated 314 to assess geographical areas at various levels of granularity (e.g., zoom in upon the neighborhood of the subject property, or zoom out to review potential comparable properties for a broader geographical area). The map image updates accordingly, both as to the map image and the inclusion of indicators for the subject and comparable properties.

Figure 4:
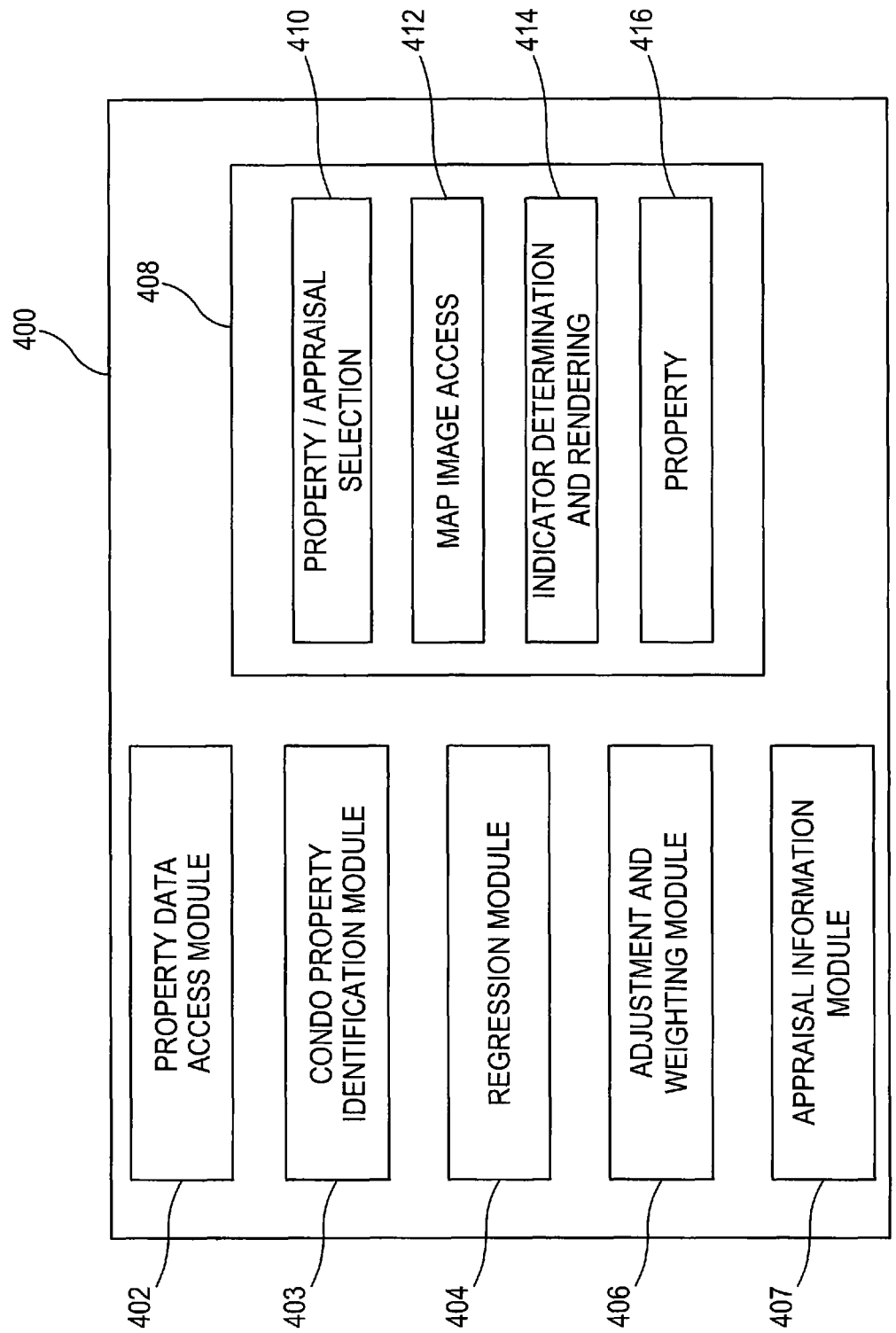
FIG. 4 is a block diagram illustrating an example of a comparable property analysis application.

FIG. 4 is a block diagram illustrating an example of a comparable property analysis application 400. The application 400 preferably comprises program code that is stored on a computer readable medium (e.g., compact disk, hard disk, etc.) and that is executable by a processor to perform operations in support of modeling and mapping comparable properties.

According to one aspect, the application includes program code executable to perform operations of accessing property data corresponding to a geographical area, and performing a regression based upon the property data, with the regression modeling the relationship between price and explanatory variables. A subject property and a plurality of comparable properties are identified, followed by determining a set of value adjustments for each of the plurality of comparable properties based upon differences in the explanatory variables between the subject property and each of the plurality of comparable properties. An economic distance between the subject property and each of the comparable properties is determined, with the economic distance constituted as a quantified value determined from the set of value adjustments for each respective comparable property. Once the properties are identified and the adjustments are determined, there is a weighting of the plurality of comparable properties based upon the appropriateness of each of the plurality of comparable properties as comparables for the subject property, the weighting being based upon one or more of the economic distance from the subject property, geographic distance from the subject property, and age of transaction.

The application 400 also includes program code for displaying a map image corresponding to the geographical area, and displaying indicators on the map image indicative of the subject property and at least one of the plurality of comparable properties, as well as ranking the plurality of comparable properties based upon the weighting, and displaying a text listing of the plurality of comparable properties according to the ranking.

The application 400 also includes program code for ranking and displaying comparable properties. Appraisal information is accessed, so as to identify a given subject property and corresponding appraiser-chosen comparable properties for the subject property. The modeling functionality previously described determines a plurality of model-chosen comparable properties based upon the appropriateness of each of the plurality of comparable properties as comparables for the subject property. Thereby, a map image corresponding to the geographical area is displayed, as well as indicators on the map image indicative of the subject property, at least one of the plurality of appraiser-chosen comparable properties, and at least one of the model-chosen comparable properties. In addition to the map image, the application 400 determines the ranked listing of comparable properties including the plurality of model-chosen comparable properties and the plurality of appraiser-chosen comparable properties, and displaying the ranked listing of comparable properties concurrently with the map image, such as in the described grid form.

The comparable property analysis application 400 is preferably provided as software, but may alternatively be provided as hardware or firmware, or any combination of software, hardware and/or firmware. The application 400 is configured to provide the comparable property modeling, appraisal results comparing and corresponding mapping functionality described herein. Although one modular breakdown of the application 400 is offered, it should be understood that the same functionality may be provided using fewer, greater or differently named modules.

The example of the comparable property analysis application 400 of FIG. 4 includes a property data access module 402, condo property identification module 403, regression module 404, adjustment and weighting module 406, appraisal information module 407, and UI module 408, with the UI module 408 further including a property and appraisal selection module 410, map image access module 412, indicator determining and rendering module 414 and property data grid/DB module 416.

The property data access module 402 includes program code for carrying access and management of the property data, whether from internal or external resources. The condo property identification module 403 includes program code carrying out the process of identifying properties as condo or otherwise, via access to a corresponding database of condo information, external resources, and application of logic to carry out the identification of condos whether by trusted source and consistency analysis, geographic condo density analysis, condo project identification analysis, or the like, as described further below. The condo property identification module 403 applies these processes to filter the property data down to that determined to be condo properties, so that corresponding pools of comparables for a condo subject property may more appropriately include condo properties.

The regression module 404 includes program code for carrying out the regression upon the accessed property data, according to the regression algorithm described above, and produces corresponding results such as the determination of regression coefficients and other data at the country (or other) level as appropriate for a subject property. The regression module 404 may implement any conventional code for carrying out the regression given the described explanatory variables and property data.

The adjustment and weighting module 406 is configured to apply the exclusion rules, and to calculate the set of adjustment factors for the individual comparables, the economic distance, and the weighting of the comparables.

The appraisal information module 407 may be a stand-alone database or may organize access to a variety of external databases of appraisal information. The appraisal information is typically in the form, of appraisal reports for subject properties, wherein a set of comparable properties chosen by an appraiser is listed. The appraisal information may be retrieved based upon a variety of criteria, including search by subject property, identification number, or characteristics (appraiser ID, vendor, date, etc.).

The UI module 408 manages the display and receipt of information to provide the described functionality. It includes a property and appraisal selection module 410, to manage the interfaces and input used to identify one or more subject properties and corresponding appraisal information. The map image access module 412 accesses mapping functions and manages the depiction of the map images as well as the indicators of the subject property and the comparable properties. The indicator determination and rendering module 414 is configured to manage which indicators should be indicated on the map image depending upon the current map image, the weighted ranking of the comparables and predetermined settings or user input. The property data grid/DB 416 manages the data set corresponding to a current session, including the subject property and pool of comparable properties. It is configured as a database that allows the property data for the properties to be displayed in a tabular or grid format, with various sorting according to the property characteristics, economic distance, geographical distance, time, etc.

Figure 5:
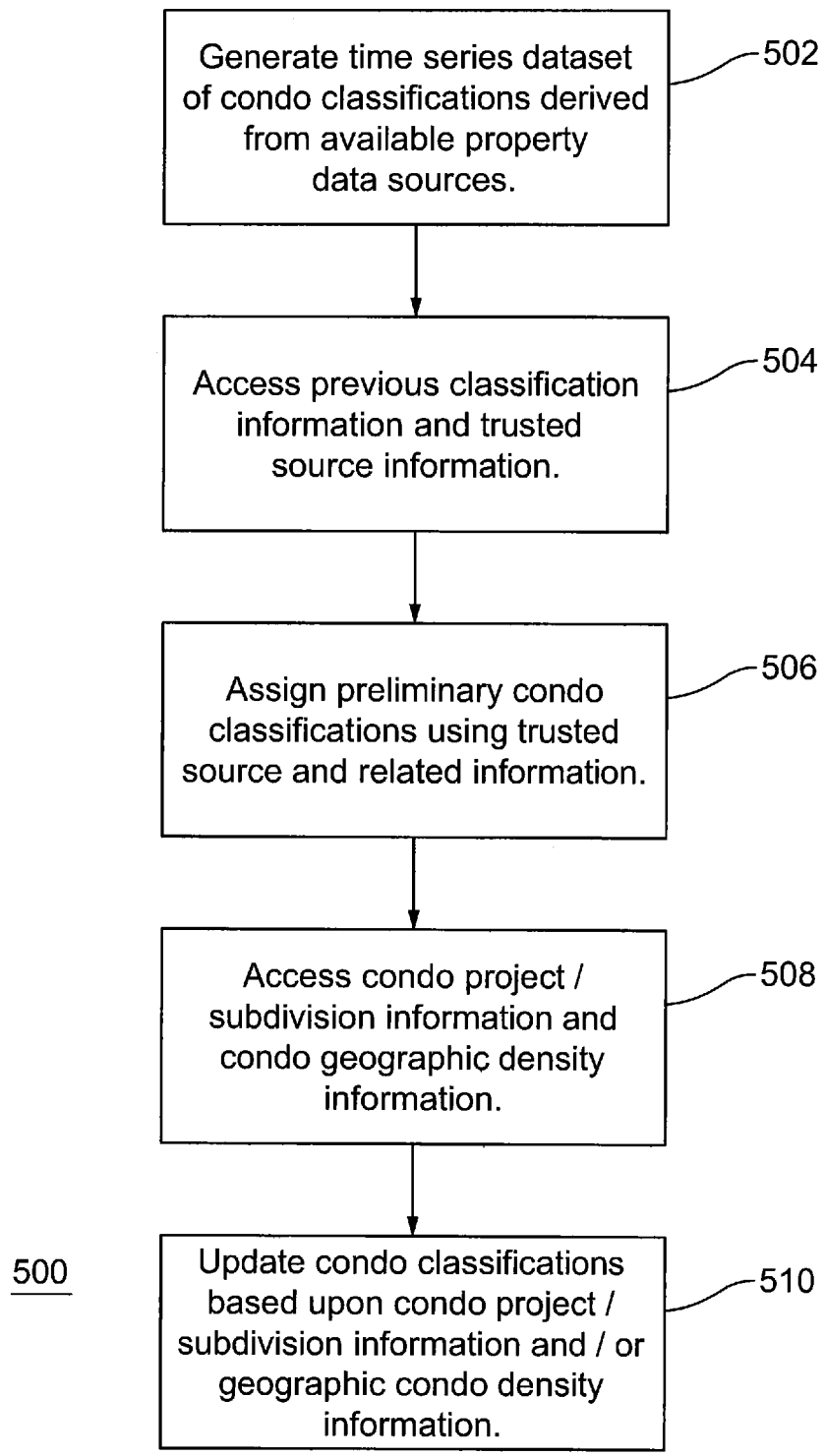
FIG. 5 is a flow diagram illustrating an example of a method for identifying condo properties.

FIG. 5 is a flow diagram illustrating an example of a method 500 for identifying condo properties.

The process includes generating 502 a time series dataset of condo classifications from the available property data sources, which may include DU submissions, MLS data, loan level records, deed records, tax records, and others. These data sources sometimes disagree with each other and even with themselves over time; however, some sources are significantly more reliable than others. For a given area a particular data source may be designated as a "trusted source", for example based on the results of data quality testing.

A database of condo classification is maintained, which includes various information including that identifying trusted sources of information, as well as existing classification information ("condo" or "not condo") for identified properties, information corresponding to condo projects and subdivisions, etc. This information is accessed 504, and a property is assigned 506 a preliminary classification (either "condo" or "not condo") and that assignment is further given a confidence level ("high," "medium," or "low") based upon the trusted source information and time series classification information. One example of the logic for determining a confidence level is as follows:

1. Where the classification data is from a current trusted source, and is consistent over time, the property classification is given a high confidence score.

2. Where classification data is not from a current trusted source, but is consistent among multiple alternative sources, with each other and over time, the property classification is given a high confidence.

3. Where the classification data is from a current trusted source, but varies over time or is missing in some instances, AND the data from the alternative sources is not consistent, the classification for the property is assigned based on the preponderance of the data, combined with logic based on the location of the property (condos tend to be concentrated in particular markets). When a property classification is assigned in this manner, it is given a medium or low confidence score based on the level of dispersion within and between sources, and the frequency at which condo properties are observed in the given area.

In this example, the preponderance refers to the single most well represented classification; depending on the number of classifications present in the data this might mean that there is no clear majority classification, but rather a largest minority. Additionally, in this context location refers to county or, in sparse counties, the MSA. Basically, in situations of ambiguity, the classification logic errs on the side of calling a property a condo if it is within a location with a lot of condos. If on the other hand the property is in an area where there are relatively few condos, then the logic errs on the side of not classifying the property as a condo.

After obtaining the preliminary property classification, the classification and confidence score may be adjusted as follows. In connection with this, additional information such as condo project/subdivision information and condo geographic density information is accessed 508, either in the maintained database, from the noted sources, or from other external resources.

The condo project/subdivision information may be identification of projects and subdivisions previously identified as condominium projects and subdivisions. In one example, a Root Identifier (ID) identifies a condo project. The Root ID is a piece of information that properties within a given condo project share. In one example, this may be a portion of the address that is common to all condo unit within a condo structure. The condo geographic density information identifies the frequency with which condo projects reside in given geographical unit areas. Upon accessing this additional information, the condo classifications are updated 510 based upon this information (e.g., the condo/project subdivision information and/or the geographic condo density information). A specific example is as follows:

1. Properties may be considered to have two identification components, a general "Root ID" and a more specific "Unit Number." As noted, the Root ID is the portion of the address that is common to all units within the structure, while the unit number is any component of the address that is unique to a given unit within the property. For every individual property classified as a condo with high confidence, all other properties that share the same Root ID are classified as a condo with medium confidence. (Any individual property with the same Root ID that had previously been classified as a condo with high confidence would remain under the high confidence classification. In the case where a property is classified as non-condo with high confidence, but also shares the same root address as a condo with a high confidence score, we will put these records aside for further verification.

2. Sometimes in the transaction data does not discretely contain the Unit Number segment of the address for a given condo project, and consequently a specific Root ID is observed with an extremely high number of transactions since every unit that transacts is being mapped to the Root ID only. In this instance, the process identifies properties with high numbers of unique tax and/or sale records in the public data and then classifies them as condos if they are located in areas with a concentration of known condos that meets a predetermined threshold. The threshold may vary by market but in one example a concentration of at least 10% condos would satisfy the predetermined threshold. If the property is in an area that is not known to contain many condo properties than it can be quarantined for further verification.

3. Within particular suburban areas, subdivisions typically contain a number of different structures all of which were built at roughly the same time and by the same builder. Consequently, within homogenous areas as such, when a condo project is identified, it is often the case that the remainder of the subdivision consists of condo properties. Consequently, if a property within a subdivision is identified as a condo with high confidence, then all other properties within the subdivision are classified as a condo with medium confidence, provided that the property is located in an area with known condos, and all of the properties within the subdivision are of a very similar age. If the subdivision appears to contain a large number of unique Root IDs relative to the subdivision size, or the various properties do not appear to have been built within a couple of years of one another, then further verification may be required before assigning the condo designation to all of the properties within the subdivision.

Figure 6B:
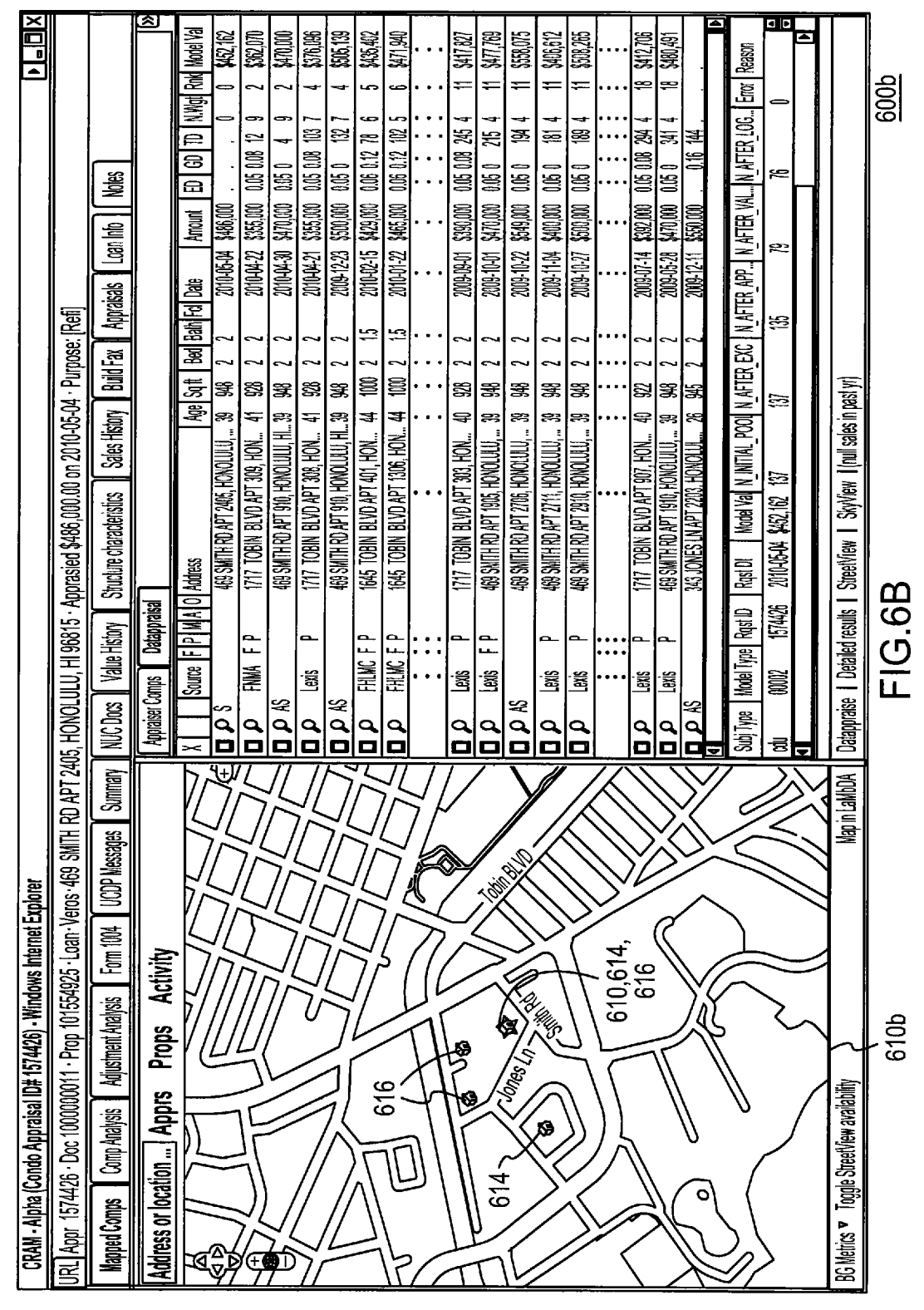

FIG. 6A is a display diagram illustrating an example of a map image 610*a* and corresponding property grid data 620*a* for a list of appraiser-chosen comparable properties, and FIG. 6B is a display diagram illustrating an example of a map image 610*a* and property grid data 620*b* updated to indicate appraiser-chosen comparable properties among a ranked listing of model-chosen comparable properties.

The map image 610*a-b* depicts a region that can be manipulated to show a larger or smaller area, or moved to shift the center of the map image, in convention fashion. This allows the user to review the location of the subject property 612 and corresponding comps 614, 616 at any desired level of granularity. This map image 610*a-b* may be separately viewed on a full screen, or may be illustrated alongside the property data grid 620*a-b* as shown.

The property grid data 620*a-b* contains a listing of details about the subject property and the comparable properties, as well as various information fields. The displayable fields may include an identifier field (e.g., "S" indicates the subject property, and "AS" indicates an appraiser-chosen comparable property), the source of data for the property ("Source"), the address of the property ("Address"), the square footage ("Sq Ft"), the lot size ("Lot"), the age of the property ("Age"), the number of bed and bathrooms ("Bed", "Bath"), the date of the prior sale ("Date"), the prior sale amount ("Amount"), the foreclosure status ("FCL", (not shown)), the economic distance ("ED"), geographic distance ("GD") and time distance ("TD", e.g., as measured in days) factors as described above, the weight ("N. Wgt"), the ranking by weight ("Rnk"), and the valuation as determined from the comparable sales model ("Model Val").

Initially, a user may navigate through an appraisal selection screen that allows the user to identify and select an appraisal report for a subject property. Once this report is selected, the map image 610*a*-*b* and property grid data 620*a*-*b* may be prompted accordingly, such that the subject property and the appraiser-chosen comparable properties are listed and displayed.

For example, FIG. 6A illustrates an example of a display screen 600*a* that concurrently displays a map image 610*a* and a corresponding property data grid 620*a* once an appraisal report for a subject property has been selected. As indicated in the property grid data, the listing identified as "S" is the subject property, and the listings identified as "AS" indicate appraiser-chosen comparable properties. The subject property 612 and appraiser-chosen comparable properties 614 are indicated in the map image as well. The model accommodates review of an appraisal that may have taken place previously. As illustrated, the appraisal report under review in this example was dated May 4, 2010.

With the condo comparable property model, often there will be multiple units corresponding to the same address. For example, the subject property 612 and some of the comparable properties 614 are at the same address and thus may be depicted via the same indicator.

The updated display screen 600*b* of FIG. 6B may be displayed following execution of the comparable property model, which identifies the comparable properties, determines adjustment factors, determines economic distance and weights the comparable properties, such as described above. At this point, the map image 610*b* is updated to include not only the subject property 612 and appraiser-chosen comparable properties 614, but also the model-chosen properties 616 that were not in the appraisal report. Again, there may be identical root addressing, and here the subject property, some of the appraiser-chosen comparable properties 614, and some of the model-chosen comparable properties are at the same building (root address).

Similarly, the property data grid 620*b* updates to include the model-chosen properties that were not in the appraisal report ("MS"). As illustrated, here, the model ranked the appraiser-chosen comparables as $2^{nd}$, $4^{th}$, $11^{th}$ and unranked (i.e., not top 20) among the properties it determined to be appropriate comparables. The listing also indicates the top 20 model-chosen comparable properties. Additionally, the map image 610*b* updatable to indicate relative geographical locations of the appraiser-chosen comparable properties 614 and the model-chosen properties 616. It should be noted that, due to the properties being located within the same condo project, there are typically less house icons perceived on the map image because they correspond to the same location on the map.

Further assessment of the data can be variously undertaken by the user. The map image 610 also allows the user to place a cursor over any of the illustrated properties to prompt highlighting of information for that property and other information. Additionally, the listing of comparables in the property grid data 620 can be updated according to any of the listed columns. The grid data can be variously sorted to allow the user to review how the subject property compares to the listed comparable properties.

Still further, the map image 610 can be divided into regions to help further assess the location of the subject property and corresponding properties. For example, the map image can be updated to indicate several Census Block Group (CBG) regions in the map image, along with trend or other data particular to each CBG. This helps the user to further assess how the subject property relates to the comparable properties, with the CBG acting as a proxy for neighborhood.

The user may variously update the map image and manipulate the property data grid in order to review and assess and subject property and the corresponding comparable properties in a fashion that is both flexible and comprehensive.

Thus embodiments of the present invention produce and provide methods and apparatus for modeling comparable properties where the subject property is a condominium property. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A non-transitory computer-readable storage medium comprising instructions that, when executed by an electronic processor, cause the electronic processor to perform a set of operations, the set of operations comprising:
   accessing, with a property data access module, property data describing properties that include condominium properties and non-condominium properties;
   identifying, with a condo property identification module, which of the properties are the condominium properties by:
      for each of the properties, searching a plurality of distinct data sources for condominium classifications or non-condominium classifications,
      for each of the properties, based on results of the searching, preliminarily classifying a condominium status and assigning a confidence level for the condominium status that has been preliminarily classified,
      for at least one of the properties that is assigned a low confidence level, increasing the confidence level of the at least one of the properties based on a determination that a root address identifier of the at least one of the properties matches a root address identifier of another property that is classified as a condominium property and assigned a high confidence level, and
      after the increasing of the confidence level of the at least one of the properties, identifying which of the properties are the condominium properties based on the condominium statuses that have been preliminarily classified and the confidence levels that have been assigned;
   determining, with a regression module, coefficients of a hedonic equation that models a relationship between price and explanatory variables, the explanatory variables including at least one variable that is specific to condominium property assessment, by regressing only the property data of the properties that were identified as the condominium properties;
   identifying, with the property data access module, a subject condominium property;
   identifying, with an adjustment and weighting module, a subset of the properties as candidate comparable properties for the subject condominium property by excluding unsuitable ones of the properties based on predefined exclusion rules, calculating an economic distance between each of the candidate comparable properties and the subject condominium property using the coefficients of the hedonic equation, and ranking the candidate comparable properties based on respective economic distances from the subject condominium property;

generating, with a user interface module, a graphical user interface including a map image area and a corresponding property grid area, the corresponding property grid area including information regarding the subject condominium property and the subset of properties as candidate comparable properties for the subject condominium property; and controlling, with the user interface module, a display to display the graphical user interface.

2. The non-transitory computer-readable storage medium of claim 1, wherein, for each of the candidate comparable properties, calculating the economic distance includes determining, with the adjustment and weighting module, a set of value adjustments based on differences in the explanatory variables between the subject condominium property and the each of the candidate comparable properties and on the coefficients, and summing, with the adjustment and weighting module executed, the set of value adjustments.

3. The non-transitory computer-readable storage medium of claim 2, wherein the set of operations further includes determining, with the adjustment and weighting module, weightings for at least some of the candidate comparable properties based upon the respective economic distances from the subject condominium property; and determining, with the adjustment and weighting module, a modeled valuation of the subject condominium property by adjusting prices of the at least some of the candidate comparable properties based on their corresponding set of value adjustments, and taking a weighted average of the prices that have been adjusted of the at least some of the candidate comparable properties based on the weightings that have been determined.

4. The non-transitory computer-readable storage medium of claim 1, wherein the set of operations further includes displaying, with a map image access module of the user interface, a map image corresponding to a geographical area in the map image area of the graphical user interface;

displaying, with the map image access module, indicators on the map image indicative of the subject condominium property and the subset of the properties identified as the candidate comparable properties.

5. The non-transitory computer-readable storage medium of claim 1, wherein the set of operations further includes identifying, with the condo property identification module, at least one trusted source from the plurality of distinct data sources;

wherein, for each of the properties, the preliminarily classifying of the condominium status and assigning the confidence level for the condominium status that has been preliminarily classified includes giving more weight to classifications in the at least one trusted source than to classifications appearing in other sources of the plurality of data distinct sources.

6. The non-transitory computer-readable storage medium of claim 1, wherein the set of operations further includes identifying, with the condo property identification module, at least one of the plurality of distinct data sources as a trusted source;

wherein, for each of the properties, the preliminarily classifying of the condominium status and the assigning of the confidence level includes applying a set of rules, wherein the set of rules includes (A) when one of the plurality of distinct sources that is the trusted source currently includes a condominium/non-condominium classification and is consistent in the condominium/non-condominium classification over time, determining the condominium status at the high confidence level based on the condominium/non-condominium classification of the trusted source;

(B) when more than one of the plurality of distinct sources includes the condominium/non-condominium classification of the each of the properties and all of the plurality of distinct sources that include the condominium/non-condominium classification of the each of the properties are consistent with each other and over time in a common condominium/non-condominium classification, determining the condominium status of the each of the properties at the high confidence level based on the common condominium/non-condominium classification of the more than one of the plurality of distinct sources; or (C) when one of the plurality of distinct sources that is the trusted source currently includes the condominium/non-condominium classification but is not consistent in the condominium/non-condominium classification over time, and when rule B is not satisfied, determining the condominium status at the confidence level that is lower than the high confidence level.

7. The non-transitory computer-readable storage medium of claim 6, further comprising:

determining, with the condo property identification module, a frequency of the condominium properties in a geographical area;

wherein, in applying the set of rules, when rule C is satisfied, assigning, with the condo property identification module, the confidence level based on the frequency of the condominium properties in the geographical area.

8. The non-transitory computer-readable storage medium of claim 1, wherein the predefined exclusion rules include a rule that excludes, from the subset of the properties identified as the candidate comparable properties, the properties that have a value of condo-fees-per-square-foot outside of a range that is determined based on a given value of condo-fees-per-square-foot of the subject condominium property.

9. The non-transitory computer-readable storage medium of claim 1, further comprising:

determining, with the adjustment and weighting module, weightings for at least some of the candidate comparable properties based upon the respective economic distances from the subject condominium property.

10. The non-transitory computer-readable storage medium of claim 9, wherein the weightings for the at least some of the candidate comparable properties are further based on a categorical variable specifying whether a respective candidate comparable property of the candidate comparable properties is from a same project or building as the subject condominium property.

11. The non-transitory computer-readable storage medium of claim 9, wherein the weightings for the at least some of the candidate comparable properties are further based on a geographic distance between the respective candidate comparable property and the subject condominium property, and wherein the weightings for the at least some of the candidate comparable properties are further based on a time from sale of the respective candidate comparable property.

12. The non-transitory computer-readable storage medium of claim 9, wherein the economic distance comprises a Euclidean norm of individual percent adjustments for all of the explanatory variables used in the regression.

13. A non-transitory computer-readable storage medium comprising instructions that, when executed by an electronic processor, cause the electronic processor to perform a set of operations, the set of operations comprising:
  accessing, with a property data access module, property data describing properties that include condominium properties and non-condominium properties;
  identifying, with a condo property identification module, which of the properties are the condominium properties by:
    for each of the properties, searching a plurality of distinct data sources for condominium classifications or non-condominium classifications,
    for each of the properties, based on results of the searching, preliminarily classifying a condominium status and assigning a confidence level for the condominium status that has been preliminarily classified,
    for at least one of the properties that is assigned a low confidence level, increasing the confidence level of the at least one of the properties based on a determination that the at least one of the properties is located in an area that has a density of condominiums above a predetermined threshold, and
    after the increasing of the confidence level of the at least one of the properties, identifying which of the properties are the condominium properties based on the condominium statuses that have been preliminarily classified and the confidence levels that have been assigned;
  determining, with a regression module, coefficients of a hedonic equation that models a relationship between price and explanatory variables, the explanatory variables including at least one variable that is specific to condominium property assessment, by regressing only the property data of the properties that were identified as the condominium properties;
  identifying, with the property data access module, a subject condominium property;
  identifying, with an adjustment and weighting module, a subset of the properties as candidate comparable properties for the subject condominium property by excluding unsuitable ones of the properties based on predefined exclusion rules, calculating an economic distance between each of the candidate comparable properties and the subject condominium property using the coefficients of the hedonic equation, and ranking the candidate comparable properties based on respective economic distances from the subject condominium property;
  generating, with a user interface module, a graphical user interface including a map image area and a corresponding property grid area, the corresponding property grid area including information regarding the subject condominium property and the subset of properties as candidate comparable properties for the subject condominium property; and
  controlling, with the user interface module, a display to display the graphical user interface.

14. A non-transitory computer-readable storage medium comprising instructions that, when executed by an electronic processor, cause the electronic processor to perform a set of operations, the set of operations comprising:
  accessing, with a property data access module, property data describing properties that include condominium properties and non-condominium properties;
  identifying, with a condo property identification module, which of the properties are the condominium properties by:
    for each of the properties, searching a plurality of distinct data sources for condominium classifications and non-condominium classifications,
    for each of the properties, based on results of the searching, preliminarily classifying a condominium status and assigning a confidence level for the condominium status that has been preliminarily classified,
    for at least one of the properties that is assigned a low confidence level, increasing the confidence level of the at least one of the properties based on a determination that the at least one of the properties is part of a subdivision that includes another property that is assigned a high confidence level, and
    after the increasing of the confidence level of the at least one of the properties, identifying which of the properties are the condominium properties based on the condominium statuses that have been preliminarily classified and the confidence levels that have been assigned;
  determining, with a regression module, coefficients of a hedonic equation that models a relationship between price and explanatory variables, the explanatory variables including at least one variable that is specific to condominium property assessment, by regressing only the property data of the properties that were identified as the condominium properties;
  identifying, with the property data access module, a subject condominium property; and
  identifying, with an adjustment and weighting module, a subset of the properties as candidate comparable properties for the subject condominium property by excluding unsuitable ones of the properties based on predefined exclusion rules, calculating an economic distance between each of the candidate comparable properties and the subject condominium property using the coefficients of the hedonic equation, and ranking the candidate comparable properties based on respective economic distances from the subject condominium property;
  generating, with a user interface module, a graphical user interface including a map image area and a corresponding property grid area, the corresponding property grid area including information regarding the subject condominium property the subset of properties as candidate comparable properties for the subject condominium property; and
  controlling, with the user interface module, a display to display the graphical user interface.

15. The non-transitory computer-readable storage medium of claim 1, wherein the corresponding property grid area further includes information regarding appraiser-selected comparables.

16. The non-transitory computer-readable storage medium of claim 13, wherein the corresponding property grid area further includes information regarding appraiser-selected comparables.

17. The non-transitory computer-readable storage medium of claim 14, wherein the corresponding property grid area further includes information regarding appraiser-selected comparables.

\* \* \* \* \*